US012724440B2

(12) United States Patent
Hsieh et al.

(10) Patent No.: US 12,724,440 B2
(45) Date of Patent: Sep. 1, 2026

(54) PARALLEL LINEAR REGULATORS WITH IMPROVED RESPONSE SPEED

(71) Applicant: NANYA TECHNOLOGY CORPORATION, New Taipei City (TW)

(72) Inventors: Po-Chun Hsieh, Taoyuan City (TW); Lin-Chen Yen, Taipei City (TW)

(73) Assignee: NANYA TECHNOLOGY CORPORATION, New Taipei City (TW)

( * ) Notice: Subject to any disclaimer, the term of this patent is extended or adjusted under 35 U.S.C. 154(b) by 225 days.

(21) Appl. No.: 18/645,397

(22) Filed: Apr. 25, 2024

(65) Prior Publication Data

US 2025/0334986 A1 Oct. 30, 2025

(51) Int. Cl.
*G05F 1/575* (2006.01)

(52) U.S. Cl.
CPC .................................... *G05F 1/575* (2013.01)

(58) Field of Classification Search
CPC .......... G05F 1/461; G05F 1/462; G05F 1/466; G05F 1/577
See application file for complete search history.

(56) References Cited

U.S. PATENT DOCUMENTS 7,321,326 B2 * 1/2008 Imai .................... H03M 1/0863 341/135
10,459,470 B2 10/2019 Jefremow et al.
2021/0191442 A1 * 6/2021 Hino .......................... G05F 1/56
2024/0014783 A1 * 1/2024 Xu ......................... H03F 1/0233

FOREIGN PATENT DOCUMENTS

| | | |
|---|---|---|
| CN | 110581639 | 12/2019 |
| CN | 114265463 | 4/2022 |
| JP | 2007219901 | 8/2007 |
| TW | 201120604 | 6/2011 |

OTHER PUBLICATIONS

"Office Action of Taiwan Counterpart Application", issued on Sep. 12, 2025, p. 1-p. 3.

* cited by examiner

*Primary Examiner* — Peter M Novak
(74) *Attorney, Agent, or Firm* — JCIPRNET

(57) ABSTRACT

A voltage regulator is provided. The voltage regulator includes output transistors, a main operating amplifier (OPA), an auxiliary circuit and a current mirror circuit. First terminals of the output transistors receive an input voltage. Second terminals of the output transistors output an output voltage. A first input terminal of the main OPA receives a reference voltage. A second input terminal of the main OPA receives a feedback voltage. An output terminal of the main OPA is coupled to control terminals of the output transistors. The auxiliary circuit provides a dynamic current according to a voltage value on the output terminal of the main OPA. The current mirror circuit provides a bias current of the main OPA according to the dynamic current. When the output voltage is decreased, the dynamic current and the bias current is increased, so that a response speed of the main OPA is accelerated.

18 Claims, 3 Drawing Sheets

PARALLEL LINEAR REGULATORS WITH IMPROVED RESPONSE SPEED

BACKGROUND

Technical Field

The disclosure generally relates to a voltage regulator, and more particularly to a voltage regulator that can automatically adjust a response speed and a power consumption of the voltage regulator.

Description of Related Art

Generally, a voltage regulator can regulate an input voltage to generate an output voltage having a stable voltage value. In order to improve a regulating effect of the voltage regulator. A response speed of the voltage regulator must be raised. However, when the response speed of the voltage regulator is raised, a power consumption of the voltage regulator is increased. Therefore, how to dynamically adjust the response speed and the power consumption of the voltage regulator according to different loading states is one of the research and development focuses of those skilled in the art.

SUMMARY

The disclosure provides a voltage regulator that can dynamically adjust a response speed and a power consumption according to different loading states.

The voltage regulator of an embodiment of the disclosure includes output transistors, a main operating amplifier (OPA), a voltage dividing circuit, an auxiliary circuit and a current mirror circuit. First terminals of the output transistors receive an input voltage. Second terminals of the output transistors output an output voltage. A first input terminal of the main OPA receives a reference voltage. An output terminal of the main OPA is coupled to control terminals of the output transistors. The voltage dividing circuit is coupled to a second input terminal of the main OPA and the second terminals of the output transistors. The voltage dividing circuit provides a feedback voltage corresponding to the output voltage to the second input terminal of the main OPA. The auxiliary circuit is coupled to the output terminal of the main OPA and the second terminals of the output transistors. The auxiliary circuit provides a dynamic current according to a voltage value on the output terminal of the main OPA. The current mirror circuit is coupled to the auxiliary circuit and the main OPA. The current mirror circuit provides a bias current of the main OPA according to the dynamic current. When the output voltage is decreased, the dynamic current is increased, the bias current of the main OPA is increased, so that a response speed of the main OPA is accelerated.

The voltage regulator of an embodiment of the disclosure includes output transistors, a main operating amplifier and an auxiliary circuit. First terminals of the output transistors receive an input voltage. Second terminals of the plurality of output transistors output an output voltage. A first input terminal of the main operating amplifier receives a reference voltage. An output terminal of the main operating amplifier is coupled to control terminals of the plurality of output transistors. A second input terminal of the main operating amplifier receives a feedback voltage corresponding to the output voltage. The auxiliary circuit is coupled to the output terminal of the main operating amplifier and the second terminals of the plurality of output transistors. The auxiliary circuit provides a dynamic current according to the output voltage and a voltage value on the output terminal of the main operating amplifier. A bias current of the main operating amplifier is varied at least according to the dynamic current.

Based on the above, the auxiliary circuit provides the dynamic current according to the voltage value on the output terminal of the main OPA. The current mirror circuit provides a bias current of the main OPA according to the dynamic current. In a heavy loading state, the output voltage is decreased, the dynamic current is increased, the bias current of the main OPA is increased, so that a response speed of the main OPA is accelerated. Therefore, the voltage regulator that can dynamically adjust the response speed and a power consumption according to different loading states.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

A disclosure may be understood by reference to the following detailed description, taken in conjunction with the drawings as described below. It is noted that, for purposes of illustrative clarity and being easily understood by the readers, various drawings of this disclosure show a portion of an electronic device, and certain elements in various drawings may not be drawn to scale. In addition, the number and dimension of each device shown in drawings are only illustrative and are not intended to limit the scope of a disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms “include”, “comprise” and “have” are used in an open-ended fashion, and thus should be interpreted to mean “include, but not limited to . . . ”. Thus, when the terms “include”, “comprise” and/or “have” are used in the description of a disclosure, the corresponding features, areas, steps, operations and/or components would be pointed to existence, but not limited to the existence of one or a plurality of the corresponding features, areas, steps, operations and/or components.

It will be understood that when an element is referred to as being “coupled to”, “connected to”, or “conducted to” another element, it may be directly connected to the other element and established directly electrical connection, or intervening elements may be presented therebetween for relaying electrical connection (indirectly electrical connection). In contrast, when an element is referred to as being "directly coupled to", "directly conducted to", or "directly connected to" another element, there are no intervening elements presented.

Figure 1:
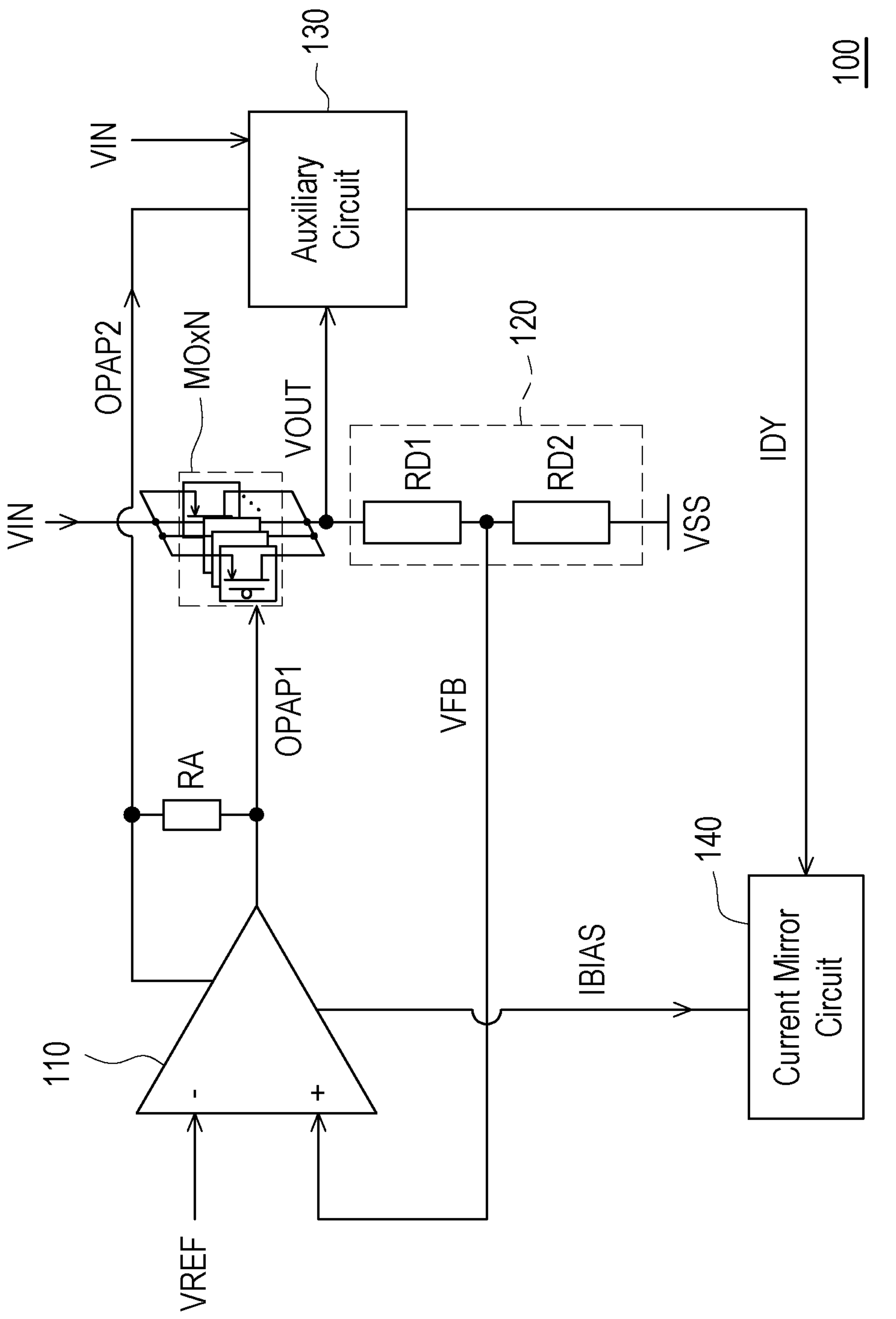
FIG. 1 illustrates a schematic diagram of a voltage regulator according to a first embodiment of the disclosure.

Please refer to FIG. 1, FIG. 1 illustrates a schematic diagram of a voltage regulator according to a first embodiment of the disclosure. In the embodiment, the voltage regulator 100 includes N output transistors MO (illustrated as "MO×N" in FIG. 1), a main operating amplifier (OPA) 110, a voltage dividing circuit 120, an auxiliary circuit 130 and a current mirror circuit 140. "N" is higher than 1. First terminals of the output transistors MO receive an input voltage VIN. Second terminals of the output transistors MO output an output voltage VOUT. A first input terminal of the main OPA 110 receives a reference voltage VREF. A second input terminal of the main OPA 110 receives a feedback voltage VFB corresponding to the output voltage VOUT. An output terminal of the main OPA 110 is coupled to control terminals of the output transistors MO.

In the embodiment, the voltage dividing circuit 120 is coupled to a second input terminal of the main OPA 110 and the second terminals of the output transistors MO. The voltage dividing circuit 120 provides the feedback voltage VFB corresponding to the output voltage VOUT to the second input terminal of the main OPA 110.

In the embodiment, each of the transistors MO is a P-type transistor, but the disclosure is not limited thereto. The first input terminal of the main OPA 110 is an inverting terminal of the main OPA 110. The second input terminal of the main OPA 110 is a noninverting terminal of the main OPA 110. In the embodiment, the output transistor MO, the main OPA 110 and the voltage dividing circuit 120 are formed as a low dropout regulator (LDO), but the disclosure is not limited thereto.

In the embodiment, the auxiliary circuit 130 is coupled to the output terminal of the main OPA 110 and the second terminals of the output transistors MO. Detailly, the auxiliary circuit 130 is coupled to the input voltage VIN and the output voltage VOUT. Furthermore, the voltage regulator 100 includes an auxiliary resistor RA. The auxiliary circuit 130 is coupled to the output terminal of the main OPA 110 through the auxiliary resistor RA. Therefore, when the main OPA 110 provides a signal OPAO1, the auxiliary circuit 130 receives a signal OPAO2 corresponding to the signal OPAO1.

The auxiliary circuit 130 provides a dynamic current IDY according to the output voltage VOUT. A bias current IBIAS of the main OPA 110 is varied at least according to the dynamic current IDY. In the embodiment, the current mirror circuit 140 is coupled to the auxiliary circuit 130 and the main OPA 110. The current mirror circuit 140 provides the bias current IBIAS of the main OPA 110 according to the dynamic current IDY.

In the embodiment, each of a response speed and a power consumption of the main OPA 110 is associated with the current IBIAS. It should be noted, the current values of the dynamic current IDY and the bias current IBIAS could be adjusted according to the output voltage VOUT based on different loading states. Therefore, the voltage regulator 100 can dynamically adjust the response speed and the power consumption according to different loading states.

For example, in a heavy loading state, the output voltage VOUT is decreased, a current value of the dynamic current IDY is increased, a current value of the bias current IBIAS of the main OPA 110 is increased. A response speed of the main OPA 110 is accelerated. Therefore, the voltage regulator 100 can provide current required by a load immediately.

For example, in a light loading state, the output voltage VOUT is increased, the current value of the dynamic current IDY is decreased, the current value of the bias current IBIAS of the main OPA 110 is decreased. Therefore, the response speed of the main OPA 110 is slowed down. Furthermore, the power consumption is decreased.

In the embodiment, the voltage dividing circuit 120 includes dividing resistors RD1, RD2. A first terminal of the dividing resistor RD1 is coupled to the second terminals of the output transistors MO. A second terminal of the dividing resistor RD1 is coupled to the second input terminal of the main OPA 110. The dividing resistor RD2 is coupled between the second input terminal of the main OPA 110 and a reference low voltage VSS (For example, ground). Therefore, a voltage value of the feedback voltage VFB positively associated to a voltage value of the output voltage VOUT.

Figure 2:
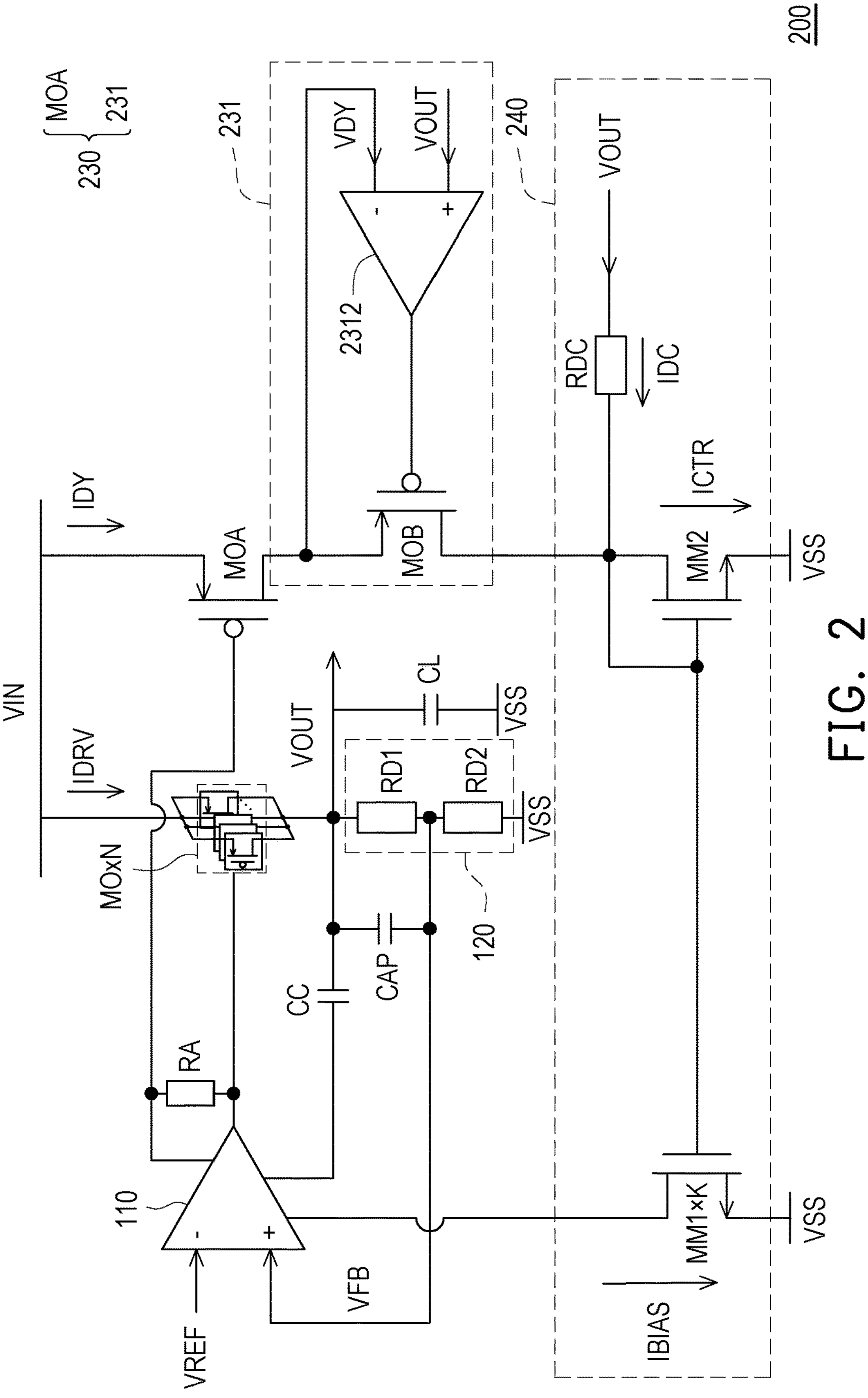
FIG. 2 illustrates a schematic diagram of a voltage regulator according to a second embodiment of the disclosure.

Please refer to FIG. 2, FIG. 2 illustrates a schematic diagram of a voltage regulator according to a second embodiment of the disclosure. In the embodiment, the voltage regulator 200 includes the N output transistors MO, the main OPA 110, the voltage dividing circuit 120, an auxiliary circuit 230 and a current mirror circuit 240. The configuration of the output transistors MO, the main OPA 110 and the voltage dividing circuit 120 has been clearly explained in the embodiments of FIG. 1, so it will not be repeated here.

In the embodiment, the auxiliary circuit 230 includes an auxiliary transistor MOA and a low dropout regulator (LDO) 231. A first terminal of the auxiliary resistor RA is coupled to the output terminal of the main OPA. A first terminal of the auxiliary transistor MOA receives the input voltage VIN. A second terminal of the auxiliary transistor MOA outputs the dynamic current IDY. A control terminal of the auxiliary transistor MOA is coupled to the second terminal of the auxiliary resistor RA. In the embodiment, the auxiliary transistor MOA is a P-type transistor, but the disclosure is not limited thereto.

In the embodiment, a response speed of the auxiliary circuit 230 is adjusted in response to a resistance value of the auxiliary resistor RA. In the embodiment, a number of the output transistors MO is higher than a number of the auxiliary transistor MOA (that is, N:1). the response speed of the auxiliary transistor MOA is higher than the response speed of the output transistors MO. If the resistance value of the auxiliary resistor RA is very high, the response speed of the auxiliary transistor MOA is more faster than the response speed of the output transistors MO. Therefore, the LDO 231 causes a high frequency oscillation. If the resistance value of the auxiliary resistor RA is very low, the response speed of the auxiliary transistor MOA is similar to the response speed of the output transistors MO. The auxiliary transistor MOA will be too late to control the LDO 231 to modify the dynamic current IDY, resulting in the inability to increase the dynamic current IDY immediately.

In the embodiment, the output transistors MO and the auxiliary transistor MOA may have the same channel width, the same channel length and the same layout style.

If the resistance value of the auxiliary resistor RA is increased, the response speed of the auxiliary transistor MOA is more faster than the response speed of the output transistors MO. The response speed (that is, switching speed) of the auxiliary transistor MOA would be less constrained from the output transistors MO. Therefore, the response speed of the auxiliary transistor MOA is faster than the response speed of the output transistors MO. Based on the voltage value on the output terminal of main OPA 110, a variation of the current value of the dynamic current IDY is more sensitive than a variation of the current value of the driving current IDRV.

If the resistance value of the auxiliary resistor RA is very high, the response speed of the auxiliary transistor MOA would not be constrained from the output transistors MO.

Therefore, the response speed of the auxiliary transistor MOA is much faster than the response speed of the output transistors MO. In this way, the resistance value of the auxiliary resistor RA could be adjusted to match a design requirement of the response speed of the auxiliary circuit 230.

In the embodiment, the LDO 231 is coupled to the second terminal of the auxiliary transistor MOA. The LDO 231 regulates a voltage value VDY on the second terminal of the auxiliary transistor MOA is similar to the voltage value of the output voltage VOUT.

It should be noted, when the voltage value VDY is similar to the voltage value of the output voltage VOUT, The LDO 231 regulates the voltage value VDY on the second terminal of the auxiliary transistor MOA is similar to the voltage value of the output voltage VOUT. Therefore, based on process-voltage-temperature variation, the dynamic current IDY is always proportional to the driving current IDRV (that is, IDY: IDRV=1: N).

The LDO 231 includes an auxiliary transistor MOB and an auxiliary OPA 2312. a first terminal of the second auxiliary transistor MOB is coupled to the second terminal of the auxiliary transistor MOA, a second terminal of the second auxiliary transistor MOB is coupled to the current mirror circuit 240. An inverting input terminal of the auxiliary OPA 2312 is coupled to the second terminal of the first auxiliary transistor MOA, a non-inverting input terminal of the auxiliary OPA 2312 receives the output voltage VOUT, an output terminal of the auxiliary OPA 2312 is coupled to a control terminal of the auxiliary transistor MOB.

In the embodiment, the current mirror circuit 240 includes K first mirror transistors MM1 (illustrated as "MM1×K" in FIG. 2), a second mirror transistor MM2 and a resistor RDC. "K" is higher than 1. First terminals of the first mirror transistors MM1 are coupled to the main OPA 110. Second terminals of the first mirror transistors MM1 are coupled to the reference low voltage VSS. A first terminal of the second mirror transistor MM2 is coupled to the second terminal of the second auxiliary transistor MOB through the LDO 231, a control terminal of the second mirror transistor MM2 and control terminals of the first mirror transistors MM1. A second terminal of the second mirror transistor MM2 are coupled to the reference low voltage VSS. The resistor RDC is coupled between the first terminal of the second mirror transistor MM2 and the output voltage VOUT. The resistor RDC provides a static current IDC according to the voltage value of the output voltage VOUT and a voltage value on the first terminal of the second mirror transistor MM2. In the embodiment, each of the first mirror transistors MM1 and the second mirror transistor MM2 is a N-type transistor, but the disclosure is not limited thereto.

In the embodiment, a current value of a control current ICTR flowing through the second mirror transistor MM2 is a summation of a current value of the dynamic current IDY and a current value of the static current IDC. The current value of the bias current IBIAS is an integer multiple of the current value of the control current ICTR. The current value of the bias current IBIAS is obtained by a formula (1).

$$IBIAS = K \times ICTR = K \times (IDC + IDY) \qquad \text{formula (1)}$$

For example, in a standby mode (that is, the light loading state), the output voltage VOUT is increased. The voltage value of the feedback voltage VFB is higher than a voltage value of the reference voltage VREF. Therefore, the output transistors MO and the auxiliary transistor MOA are all turned off. The current value of the dynamic current IDY is similar to 0 ampere. Therefore, the current value of the bias current IBIAS is the integer multiple of the static current IDC (that is, IBIAS≈K×IDC). The response speed of the main OPA 110 is slowed down. Furthermore, the power consumption is decreased.

For example, in an active mode (that is, the heavy loading state), the output voltage VOUT is decreased. The voltage value of the feedback voltage VFB is lower than a voltage value of the reference voltage VREF. Therefore, the output transistors MO and the auxiliary transistor MOA are all turned on. The current value of the dynamic current IDY is increased. Therefore, the current value of the bias current IBIAS is the integer multiple of the control current ICTR (that is, IBIAS=K×(IDC+IDY)). The response speed of the main OPA 110 is accelerated. Therefore, the voltage value of the feedback voltage VFB can reach the voltage value of the reference voltage VREF in a shorter time length.

For example, in the active mode, when the voltage value of the input voltage VIN (that is, power voltage) is lower than a target output voltage value, the voltage value of the feedback voltage VFB is lower than the voltage value of the reference voltage VREF. Even if the output transistors MO and the auxiliary transistor MOA are all turned on, the voltage value of the output voltage VOUT cannot reach the target output voltage value. The LDO 231 regulates the voltage value VDY on the second terminal of the auxiliary transistor MOA is similar to the voltage value of the output voltage VOUT and the voltage value of the input voltage VIN. Thus, the current value of the dynamic current IDY is similar to 0 ampere. The current value of a control current ICTR is similar to the current value of the static current IDC. Therefore, the current value of the bias current IBIAS is the integer multiple of the static current IDC (that is, IBIAS≈K×IDC).

In other words, when the voltage value of the input voltage VIN is lower than a target output voltage value, the LDO 231 decreases the power consumption of the voltage regulator 200.

In the embodiment, the voltage regulator 200 further includes capacitor CAP, CC and a load capacitor CL. A first terminal of the capacitor CAP is coupled to the second terminals of the output transistors MO. A second terminal of the capacitor CAP is coupled to the second input terminal of the main OPA. A first terminal of the capacitor CC is coupled to the second terminals of the output transistors MO. A second terminal of the capacitor CC is coupled to the main OPA. The capacitor CC is served as miller capacitor (cascode miller capacitor). The capacitor CC may broaden a response frequency bandwidth of the voltage regulator 200. The capacitor CAP may increase the response speed of the voltage regulator 200. The load capacitor CL is coupled between the first terminal of the dividing resistor RD1 and reference low voltage VSS. The load capacitor CL is used to stable the voltage value of the output voltage VOUT.

Figure 3:
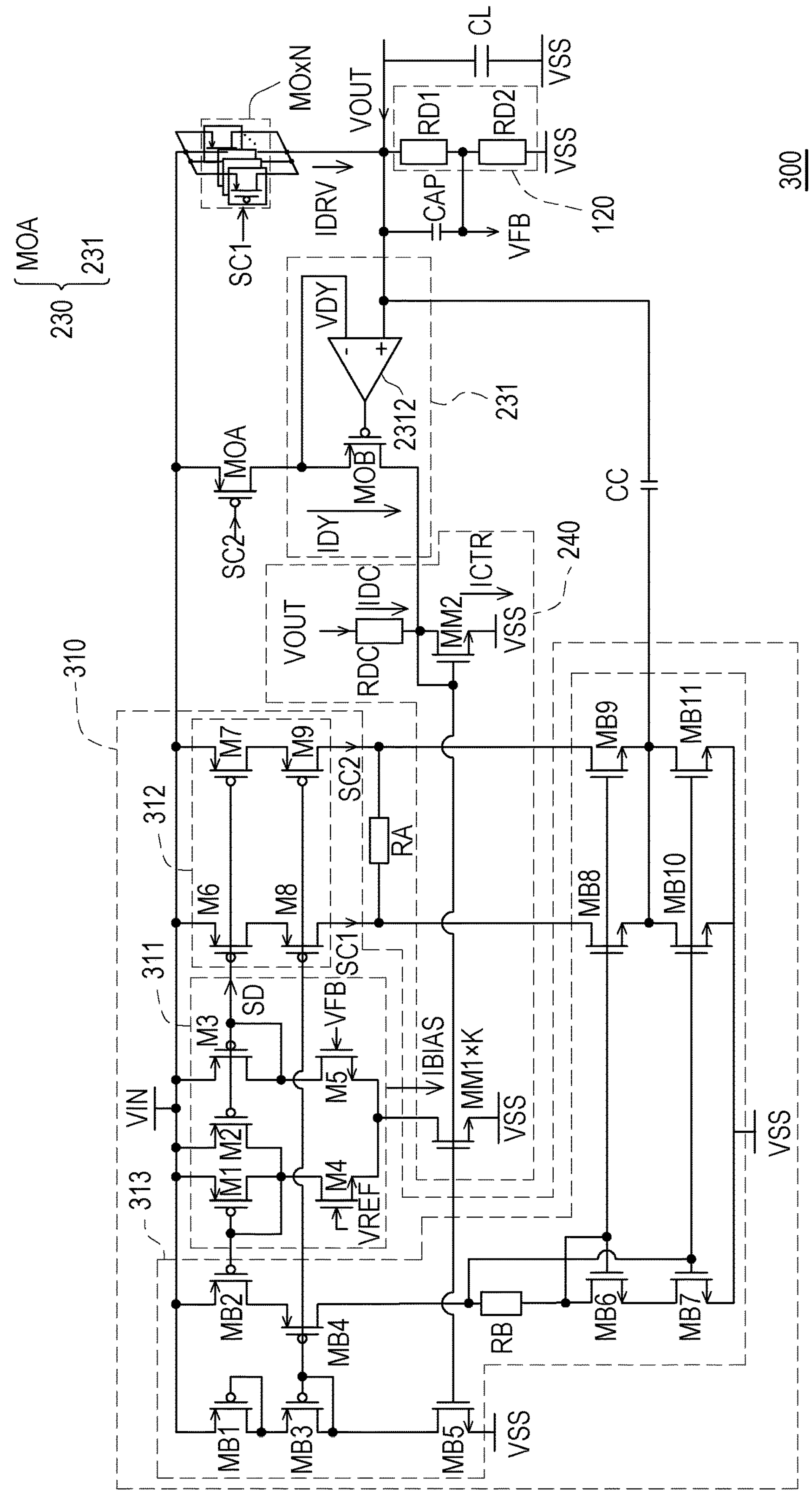
FIG. 3 illustrates a schematic diagram of a voltage regulator according to a third embodiment of the disclosure.

Please refer to FIG. 3, FIG. 3 illustrates a schematic diagram of a voltage regulator according to a third embodiment of the disclosure. In the embodiment, the voltage regulator 300 includes the N output transistors MO, the main OPA 310, the voltage dividing circuit 120, the auxiliary circuit 230, the current mirror circuit 240 and the capacitor CAP, CC, the load capacitor CL and the auxiliary resistor RA. The auxiliary circuit 230 includes the auxiliary transistor MOA and the LDO 231. The current mirror circuit 240 includes the K first mirror transistors MM1, the second mirror transistor MM2 and the resistor RDC. The output transistors MO, the voltage dividing circuit 120, the auxiliary circuit 230, the current mirror circuit 240 and the capacitor CAP have been clearly explained in the embodiments of FIG. 1 and FIG. 2, so it will not be repeated here.

In the embodiment, the main OPA 310 includes a differential circuit 311 and an output circuit 312. The differential circuit 311 is coupled to the voltage dividing circuit and the current mirror circuit. The differential circuit 311 provides a differential signal SD according to the reference voltage VREF and the feedback voltage VFB. The output circuit 312 is coupled to the differential circuit 311, the auxiliary circuit 230 and the output transistors MO. The output circuit 312 controls the output transistors MO in response to the differential signal SD.

In the embodiment, the differential circuit 311 includes input stage transistors M1 to M5, but the disclosure is not limited thereto. A first terminal of the input stage transistor M1 receives the input voltage VIN. A second terminal of the input stage transistor M1 is coupled to a control terminal of the input stage transistor M1. A first terminal of the input stage transistor M2 receives the input voltage VIN. A second terminal of the input stage transistor M2 is coupled to the second terminal of the input stage transistor M1. A first terminal of the input stage transistor M3 receives the input voltage VIN. A second terminal of the input stage transistor M3 is coupled to a control terminal of the input stage transistor M3. A first terminal of the input stage transistor M4 is coupled to the second terminal of the input stage transistor M1. A second terminal of the input stage transistor M4 is coupled to the first terminals of the first mirror transistors MM1. A control terminal of the input stage transistor M4 receives the reference voltage VREF. A first terminal of the input stage transistor M5 is coupled to the second terminal of the input stage transistor M3. A second terminal of the input stage transistor M5 is coupled to the first terminals of the first mirror transistors MM1. A control terminal of the input stage transistor M5 receives the feedback voltage VFB.

In the embodiment, the output circuit 312 includes output stage transistors M6 and M7. A first terminal of the output stage transistor M6 receives the input voltage VIN. A second terminal of the output stage transistor M6 is coupled to the first terminal of the auxiliary resistor RA. A control terminal of the output stage transistor M6 receives the differential signal SD. A first terminal of the output stage transistor M7 receives the input voltage VIN. A second terminal of the output stage transistor M7 is coupled to the second terminal of the auxiliary resistor RA. A control terminal of the output stage transistor M7 receives the differential signal SD.

In the embodiment, the differential circuit 311 is an input stage of the main OPA 310. the output circuit 312 is an output stage of the main OPA 310. The output circuit 312 provides a control signal SC1 to the control terminals of the output transistors MO and the first terminal of the auxiliary resistor RA. The output circuit 312 provides a control signal SC2 to the control terminal of the auxiliary transistor MOA and the second terminal of the auxiliary resistor RA. The control signal SC1 is equal to the control signal SC2. Therefore, a power consumption of the auxiliary resistor RA is very low.

In the embodiment, the main OPA 310 further includes a biasing circuit 313, but the disclosure is not limited thereto. The biasing circuit 313 is coupled to the first terminal of the auxiliary resistor RA, the second terminal of the auxiliary resistor RA, the differential circuit 311 and the output circuit 312.

The output circuit 312 further includes output stage transistors M8 and M9, but the disclosure is not limited thereto. A first terminal of the output stage transistor M8 is coupled to the second terminal of the output stage transistor M6. A second terminal of the output stage transistor M8 is coupled to the first terminal of the auxiliary resistor RA. A control terminal of the output stage transistor M8 is coupled to the biasing circuit 313. A first terminal of the output stage transistor M9 is coupled to the second terminal of the output stage transistor M7. A second terminal of the output stage transistor M9 is coupled to the second terminal of the auxiliary resistor RA. A control terminal of the output stage transistor M9 is coupled to the biasing circuit 313.

The capacitor CC is coupled between the biasing circuit 313 and the non-inverting input terminal of the auxiliary OPA 2312, but the disclosure is not limited thereto.

The biasing circuit 313 includes transistors MB1 to MB11 and a resistor RB. A first terminal of the transistor MB1 receives the input voltage VIN. A second terminal of the transistor MB1 is coupled to a control terminal of the transistor MB1. A first terminal of the transistor MB2 receives the input voltage VIN. A control terminal of the transistor MB2 is coupled to the control terminal of the input stage transistor M1. A first terminal of the transistor MB3 is coupled to the second terminal of the transistor MB1. A second terminal of the transistor MB3 is coupled to a control terminal of the transistor MB3. A first terminal of the transistor MB4 is coupled to the second terminal of the transistor MB2. A control terminal of the transistor MB4 is coupled to the control terminal of the transistor MB3, the control terminal of the output stage transistor M8 and the control terminal of the output stage transistor M9. A first terminal of the transistor MB5 is coupled to the second terminal of the transistor MB3. A second terminal of the transistor MB5 is coupled to the reference low voltage VSS. A control terminal of the transistor MB5 is coupled to the control terminals of the first mirror transistors MM1 and the control terminal of the second mirror transistor MM2.

A first terminal of the resistor RB is coupled to a second terminal of the transistor MB4. A first terminal of the transistor MB6 is coupled to a second terminal of the resistor RB and a control terminal of the transistor MB6. A first terminal of the transistor MB7 is coupled to a second terminal of the transistor MB6. A second terminal of the transistor MB7 is coupled to the reference low voltage VSS. A control terminal of the transistor MB7 is coupled to the first terminal of the resistor RB.

A first terminal of the transistor MB8 is coupled to the second terminal of the output stage transistor M8 and the first terminal of the auxiliary resistor RA. A second terminal of the transistor MB8 is coupled to the second terminal of the capacitor CC. A control terminal of the transistor MB8 is coupled to the control terminal of the transistor MB6. A first terminal of the transistor MB9 is coupled to the second terminal of the output stage transistor M9 and the second terminal of the auxiliary resistor RA. A second terminal of the transistor MB9 is coupled to the second terminal of the capacitor CC. A control terminal of the transistor MB9 is coupled to the control terminal of the transistor MB6. A first terminal of the transistor MB10 is coupled to the second terminal of the transistor MB8. A second terminal of the transistor MB10 is coupled to the reference low voltage VSS. A control terminal of the transistor MB10 is coupled to the control terminal of the transistor MB7. A first terminal of the transistor MB11 is coupled to the second terminal of the transistor MB9. A second terminal of the transistor MB11 is coupled to the reference low voltage VSS. A control terminal of the transistor MB11 is coupled to the control terminal of the transistor MB7.

In the embodiment, each of the input stage transistors M1 to M3, the output stage transistors M6 to M9 and transistors MB1 to MB4 is a P-type transistor, but the disclosure is not limited thereto. In the embodiment, each of the input stage transistors M4, M5 and transistors MB5 to MB11 is a N-type transistor, but the disclosure is not limited thereto.

For example, in the light loading state, the output voltage VOUT is increased. The voltage value of the feedback voltage VFB is higher than a voltage value of the reference voltage VREF. A voltage value on the control terminal of the input stage transistor M3 is decreased. Furthermore, a voltage value on the control terminal of the input stage transistor M1 is increased. Voltage values on the control terminals of the transistors MB8 to MB10 are decreased. Therefore, both voltage values of the control signal SC1 and the control signal SC2 are increased. Both current values the driving current IDRV flowing through the output transistors MO and the dynamic current IDY flowing through the auxiliary transistor MOA are decreased. The current value of the bias current IBIAS is decreased based on the formula (1). Therefore, the response speed of the main OPA 310 is slowed down. Furthermore, the power consumption is decreased.

For example, in the heavy loading state, the output voltage VOUT is decreased. The voltage value of the feedback voltage VFB is lower than the voltage value of the reference voltage VREF. The voltage value on the control terminal of the input stage transistor M3 is increased. Furthermore, the voltage value on the control terminal of the input stage transistor M1 is decreased. The voltage values on the control terminals of the transistors MB8 to MB10 are increased. Therefore, both the voltage values of the control signal SC1 and the control signal SC2 are decreased. Both the current values the driving current IDRV and the dynamic current IDY are increased. The current value of the bias current IBIAS is increased. Therefore, the response speed of the main OPA 310 is accelerated.

In view of the foregoing, the auxiliary circuit provides the dynamic current according to the voltage value on the output terminal of the main OPA. The current mirror circuit provides a bias current of the main OPA according to the dynamic current. In the heavy loading state, the output voltage is decreased, the dynamic current is increased, the bias current of the main OPA is increased, so that a response speed of the main OPA is accelerated. In the light loading state, the output voltage is increased, the dynamic current is decreased, the bias current of the main OPA is decreased, so that a response speed of the main OPA is slowed down. The power consumption of the voltage regulator is decreased. In this way, the voltage regulator that can dynamically adjust the response speed and the power consumption according to different loading states.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A voltage regulator, comprising:

a plurality of output transistors, first terminals of the plurality of output transistors receive an input voltage, second terminals of the plurality of output transistors output an output voltage;

a main operating amplifier, a first input terminal of the main operating amplifier receives a reference voltage, an output terminal of the main operating amplifier is coupled to control terminals of the plurality of output transistors;

an auxiliary resistor, a first terminal of the auxiliary resistor is coupled to the output terminal of the main operating amplifier;

a voltage dividing circuit, coupled to a second input terminal of the main operating amplifier and the second terminals of the plurality of output transistors, and configured to provide a feedback voltage corresponding to the output voltage to the second input terminal of the main operating amplifier;

an auxiliary circuit, coupled to the output terminal of the main operating amplifier and the second terminals of the plurality of output transistors, and configured to provide a dynamic current according to a voltage value on the output terminal of the main operating amplifier, wherein the auxiliary circuit comprises:

a first auxiliary transistor, a first terminal of the first auxiliary transistor receives the input voltage, a second terminal of the first auxiliary transistor outputs the dynamic current, and a control terminal of the first auxiliary transistor is coupled to the second terminal of the auxiliary resistor;

a current mirror circuit, coupled to the auxiliary circuit and the main operating amplifier, and configured to provide a bias current of the main operating amplifier according to the dynamic current, wherein when the output voltage is decreased, a current value of the dynamic current is increased, a current value of the bias current of the main operating amplifier is increased, so that a response speed of the main operating amplifier is accelerated.

2. The voltage regulator of claim 1, wherein a response speed of the auxiliary circuit is adjusted in response to a resistance value of the auxiliary resistor.

3. The voltage regulator of claim 1, further comprising:

a second capacitor, a first terminal of the second capacitor is coupled to the second terminals of the plurality of output transistors, a second terminal of the second capacitor is coupled to the second input terminal of the main operating amplifier.

4. The voltage regulator of claim 1, wherein the auxiliary circuit further comprises:

a low dropout regulator, coupled to the second terminal of the first auxiliary transistor, and configured to regulate a voltage value on the second terminal of the first auxiliary transistor is similar to a voltage value of the output voltage.

5. The voltage regulator of claim 4, wherein the low dropout regulator comprises:

a second auxiliary transistor, a first terminal of the second auxiliary transistor is coupled to the second terminal of the first auxiliary transistor, a second terminal of the second auxiliary transistor is coupled to the current mirror circuit; and an auxiliary operating amplifier, an inverting input terminal of the auxiliary operating amplifier is coupled to the second terminal of the first auxiliary transistor, a non-inverting input terminal of the auxiliary operating amplifier receives the output voltage, an output terminal of the auxiliary operating amplifier is coupled to a control terminal of the second auxiliary transistor.

6. The voltage regulator of claim 5, wherein the current mirror circuit comprises a plurality of first mirror transistors, first terminals of the plurality of first mirror transistors are coupled to the main operating amplifier, second terminals of the plurality of first mirror transistors are coupled to a reference low voltage;

a second mirror transistor, a first terminal of the second mirror transistor is coupled to the second terminal of the second auxiliary transistor, a control terminal of the second mirror transistor is coupled to control terminals of the plurality of first mirror transistors, a second terminal of the second mirror transistor is coupled to the reference low voltage; and a resistor, coupled between the first terminal of the second mirror transistor and the output voltage.

7. The voltage regulator of claim 6, wherein the resistor provides a static current according to a voltage value of the output voltage and a voltage value on the first terminal of the second mirror transistor.

8. The voltage regulator of claim 7, wherein:

a current value of a control current flowing through the second mirror transistor is a summation of a current value of the dynamic current and a current value of the static current, and a current value of the bias current is an integer multiple of the current value of the control current.

9. The voltage regulator of claim 6, wherein the main operating amplifier comprises:

a differential circuit, coupled to the voltage dividing circuit and the current mirror circuit, and configured to provide a differential signal according to the reference voltage and the feedback voltage; and an output circuit, coupled to the differential circuit, the auxiliary circuit and the plurality of output transistors, and configured to control the plurality of output transistors in response to the differential signal.

10. The voltage regulator of claim 9, wherein the differential circuit comprises:

a first input stage transistor, a first terminal of the first input stage transistor receives the input voltage, a second terminal of the first input stage transistor is coupled to a control terminal of the first input stage transistor;

a second input stage transistor, a first terminal of the second input stage transistor receives the input voltage, a second terminal of the second input stage transistor is coupled to the second terminal of the first input stage transistor;

a third input stage transistor, a first terminal of the third input stage transistor receives the input voltage, a second terminal of the third input stage transistor is coupled to a control terminal of the third input stage transistor;

a fourth input stage transistor, a first terminal of the fourth input stage transistor is coupled to the second terminal of the first input stage transistor, a second terminal of the fourth input stage transistor is coupled to the first terminals of the plurality of first mirror transistors, a control terminal of the fourth input stage transistor receives the reference voltage; and a fifth input stage transistor, a first terminal of the fifth input stage transistor is coupled to the second terminal of the third input stage transistor, a second terminal of the fifth input stage transistor is coupled to the first terminals of the plurality of first mirror transistors, a control terminal of the fifth input stage transistor receives the feedback voltage.

11. The voltage regulator of claim 10, wherein the output circuit comprises:

a first output stage transistor, a first terminal of the first output stage transistor receives the input voltage, a second terminal of the first output stage transistor is coupled to the first terminal of the auxiliary resistor, a control terminal of the first output stage transistor receives the differential signal; and a second output stage transistor, a first terminal of the second output stage transistor receives the input voltage, a second terminal of the second output stage transistor is coupled to the second terminal of the auxiliary resistor, a control terminal of the second output stage transistor receives the differential signal.

12. The voltage regulator of claim 9, wherein the main operating amplifier comprises:

a biasing circuit, coupled to the first terminal of the auxiliary resistor, the second terminal of the auxiliary resistor, the differential circuit and the output circuit.

13. The voltage regulator of claim 12, further comprising:

a first capacitor, a first terminal of the first capacitor is coupled to the second terminals of the plurality of output transistors, a second terminal of the first capacitor is coupled to the biasing circuit.

14. A voltage regulator, comprising:

a plurality of output transistors, first terminals of the plurality of output transistors receive an input voltage, second terminals of the plurality of output transistors output an output voltage;

a main operating amplifier, a first input terminal of the main operating amplifier receives a reference voltage, an output terminal of the main operating amplifier is coupled to control terminals of the plurality of output transistors, a second input terminal of the main operating amplifier receives a feedback voltage corresponding to the output voltage;

an auxiliary resistor, a first terminal of the auxiliary resistor is coupled to the output terminal of the main operating amplifier; and an auxiliary circuit, coupled to the output terminal of the main operating amplifier and the second terminals of the plurality of output transistors, and configured to provide a dynamic current according to the output voltage and a voltage value on the output terminal of the main operating amplifier, wherein the auxiliary circuit comprises:

a first auxiliary transistor, a first terminal of the first auxiliary transistor receives the input voltage, a second terminal of the first auxiliary transistor outputs the dynamic current, and a control terminal of the first auxiliary transistor is coupled to the second terminal of the auxiliary resistor;

wherein a bias current of the main operating amplifier is varied at least according to the dynamic current.

15. The voltage regulator of claim 14, further comprising:

a voltage dividing circuit, coupled to a second input terminal of the main operating amplifier and the second terminals of the plurality of output transistors, and configured to provide the feedback voltage.

16. The voltage regulator of claim 15, wherein the auxiliary circuit further comprises:

a low dropout regulator, coupled to the second terminal of the first auxiliary transistor, and configured to regulate a voltage value on the second terminal of the first auxiliary transistor is similar to a voltage value of the output voltage.

17. The voltage regulator of claim 14, further comprising:

a current mirror circuit, coupled to the auxiliary circuit and the main operating amplifier, and configured to provide the bias current based on the dynamic current and the output voltage.

18. The voltage regulator of claim 17, wherein the current mirror circuit comprises:

a plurality of first mirror transistors, first terminals of the plurality of first mirror transistors are coupled to the main operating amplifier to provide the bias current, second terminals of the plurality of first mirror transistors are coupled to a reference low voltage;

a second mirror transistor, a first terminal of the second mirror transistor is coupled to the auxiliary circuit to receive the dynamic current, a control terminal of the second mirror transistor is coupled to control terminals of the plurality of first mirror transistors and the first terminal of the second mirror transistor, a second terminal of the second mirror transistor is coupled to the reference low voltage; and a resistor, coupled between the first terminal of the second mirror transistor and the output voltage to generate a static current to the second mirror transistor.

* * * * *